(12) United States Patent
Collins et al.

(10) Patent No.: US 7,666,387 B2
(45) Date of Patent: Feb. 23, 2010

(54) CARBONATE THERMOCHEMICAL CYCLE FOR THE PRODUCTION OF HYDROGEN

(75) Inventors: Jack L Collins, Knoxville, TN (US);
Leslie R Dole, Knoxville, TN (US);
Juan J Ferrada, Knoxville, TN (US);
Charles W Forsberg, Oak Ridge, TN (US); Marvin J Haire, Oak Ridge, TN (US); Rodney D Hunt, Oak Ridge, TN (US); Benjamin E Lewis, Jr., Knoxville, TN (US); Raymond G Wymer, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 266 days.

(21) Appl. No.: 11/874,958

(22) Filed: Oct. 19, 2007

(65) Prior Publication Data
US 2009/0104111 A1 Apr. 23, 2009

(51) Int. Cl.
*C01B 3/02* (2006.01)
*C01B 13/14* (2006.01)

(52) U.S. Cl. .................... 423/657; 423/438; 423/593.1; 423/594.15; 423/648.1

(58) Field of Classification Search .............. 423/648.1, 423/594.15, 438, 593.1
See application file for complete search history.

(56) References Cited

U.S. PATENT DOCUMENTS

| 4,192,726 A | 3/1980 | Pangborn et al. |
| 4,314,984 A | 2/1982 | Lawson et al. |
| 4,332,650 A | 6/1982 | Foh et al. |
| 4,440,733 A | 4/1984 | Lawson et al. |

OTHER PUBLICATIONS

Robinson, Paul R. "An Acid-Base Model for Thermochemical Water Splitting: Results of Experimental Tests on Manganese-Bases Thermochemical Cylcles", Proceedings of the Annual Meeting-American Section of the International Solar Energy Society (1980), 3 (Sect. 1), 135-8 (no month).*
Sayama, Kazuhiro et al et al, "Remarkable effect of sodium carbonate addition on photodecomposition of liquid water into hydrogen and oxygen from a suspension of semiconductor powder loaded with various metals", Natl. Chem. Lab. Ind., Tsukuba, 305, Japan Chemistry Letters (1992), (2), 253-6 (no month).*
Langmuir, Donald, Uranium Solution—Mineral Equilibria at Low Temperatures with Applications to Sedimentary Ore Deposits, Geochimica or Cosmochimica Acta, 1978, pp. 547-569, vol. 42.
L.C. Brown, et al., High Efficiency Generation of Hydrogen Fuels Using Nuclear Power, Final Technical Report for the Period of Aug. 1, 1999 through Sep. 30, 2002, General Atomics Report GA-A24285, 2003.
L.O. Williams, Hydrogen Power: An Introduction to Hydrogen Energy and its Applications, 1980, pp. 49-91, Chapter 4.

* cited by examiner

*Primary Examiner*—Wayne Langel
(74) *Attorney, Agent, or Firm*—Edna I. Gergel

(57) ABSTRACT

The present invention is directed to a thermochemical method for the production of hydrogen from water. The method includes reacting a multi-valent metal oxide, water and a carbonate to produce an alkali metal-multi-valent metal oxide compound, carbon dioxide, and hydrogen.

7 Claims, 4 Drawing Sheets

Anion resin exchange to separate sodium carbonate from ammonium uranyl tricarbonate:

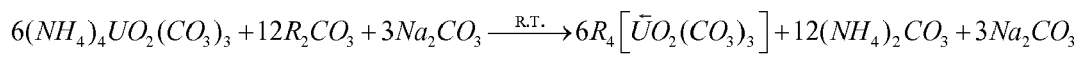

Thermal decomposition of ammonium carbonate to separate it from sodium carbonate:

$$12(NH_4)_2CO_3 + 3Na_2CO_3 \xrightarrow{<100°C} 3Na_2CO_3 + 24NH_3\uparrow + 12CO_2\uparrow + 12H_2O\uparrow$$

*{CAPTURE $NH_3$, $CO_2$, $H_2O$}{$Na_2CO_3$ to $H_2$ production step}*

Resin elution to recover tricarbonate and regenerate resin in carbonate form:

Thermal decomposition of tricarbonate to form oxygen and regenerate $U_3O_8$:

$$6(NH_4)_4UO_2(CO_3)_3 \xrightarrow{150\text{-}400°C} 24NH_3 + 18CO_2 + 2U_3O_8 + O_2 + 12H_2O$$

FIG. 3

CARBONATE THERMOCHEMICAL CYCLE FOR THE PRODUCTION OF HYDROGEN

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

FIELD OF THE INVENTION

This invention relates to the field of hydrogen generation, and is particularly concerned with a carbonate thermochemical cycle for producing hydrogen.

BACKGROUND OF THE INVENTION

There is worldwide, as well as national interest, in the development of a hydrogen economy. Potentially the most efficient, cost effective, and large scale means of obtaining hydrogen is from thermochemical methods.

In a thermochemical process, heat plus water yields hydrogen and oxygen. All other chemicals within the process are fully recycled. While more than 100 such thermochemical cycles have been identified, only a few are considered potentially viable.

To be practical, a thermochemical cycle must be efficient, be non-polluting, involve relatively few chemical reactions, and have acceptable capital costs. The leading candidates are the sulfur cycles (sulfur iodine (SI) and hybrid sulfur (HS)). While these processes have desirable characteristics, they have three highly undesirable characteristics: (1) the operating temperature is ~850° C. with pressure of ~10 atm, (2) because of the presence of pressurized, corrosive iodine and concentrated sulfuric acid, the materials of construction will be very expensive, and (3) the processes have significant inventories of pressurized, hot, hazardous volatile chemical reagents.

The SI operating of ~850° C. is at the very limits of practical engineering materials. Lowering the peak temperatures by 100 to 200 degrees would significantly improve process viability. In addition, the chemical reagents used in these processes are also a concern because they are highly toxic volatile dense gases that, in case of an accident, could travel off-site at ground level.

The current two candidate thermochemical processes are the sulfur-iodine (SI) process and the hybrid sulfur (HS) cycles. These processes require heat input at ~850° C. if the process operates at ~10 atm. The highly endothermic (heat-absorbing) gas-phase reactions in each of these processes are $$2H_2SO_4 \leftrightarrows 2H_2O + 2SO_3 \leftrightarrows 2SO_2 + 2H_2O + O_2 \text{ (850° C.)} \quad \text{(Eq. 1)}$$

These two thermochemical processes have other lower-temperature chemical reactions. The SI process has two other lower temperature chemical reactions (equations 2 and 3), which, when combined with the reaction in equation 1, (1) yield $H_2$ and $O_2$ from water and heat and (2) recycle all other chemical reagents.

$$I_2 + SO_2 + 2H_2O \leftrightarrows 2HI + H_2SO_4 \text{ (120° C.)} \quad \text{(Eq. 2)}$$

$$HI \leftrightarrows I_2 + H_2 \text{ (450° C.)} \quad \text{(Eq. 3)}$$

The HS process (also known as Westinghouse, GA-22, and Ispra Mark 11) has a single low-voltage electrochemical step (Eq. 4) that is needed to complete the cycle.

$$SO_2(aq) + 2H_2O(l) \leftrightarrows H_2SO_4(aq) + H_2(g) \text{ (Electrolysis: 80° C.)} \quad \text{(Eq. 4)}$$

The greatest practical challenge of the sulfur process is the high temperatures required for each of the sulfur iodine and hybrid sulfur cycles. In each of these cycles, the high-temperature sulfur trioxide ($SO_3$) dissociation reaction (Eq. 1) is an equilibrium chemical reaction that requires a catalyst. High temperatures and high pressures are required to drive the reaction towards completion and acceptable yields. Detailed studies have concluded that the required minimum temperatures need to be very high (825 to 850° C.) to drive the $SO_3$ decomposition to near completion.

After the high-temperature dissociation reaction, all the chemicals must be cooled to near room temperature, the oxygen separated out and released to the atmosphere, the $SO_2$ sent to the next chemical reaction, and the unreacted sulfuric acid (formed by recombination of $SO_3$ and $H_2O$ at lower temperatures) reheated to high temperatures. Unless the chemical reactions go almost to completion, the energy losses in separations and the heat exchangers to heat and cool all the unreacted reagents result in a very inefficient and uneconomical process. An analysis of the SI flowsheet showed that process efficiencies decreased very rapidly with decreasing temperature resulting in incomplete dissociation of $SO_3$, such that the process could not produce $H_2$ below 700° C.

The efficiency of a thermochemical process depends on the reactions' yields and the energy losses associated with the processing equipment. Higher temperatures result in higher heat losses from the plant and higher pressures require more energy for the compression and pumping. Therefore, lowering the temperatures and pressures of thermochemical cycle generally improves the overall thermal efficiency of the process. Also, the release of dense toxic gases that can spread offsite is a threat to public safety. The SI and SH processes both have large inventories of hot, pressurized hazardous gases that are heavier than air and capable of spreading along the ground and incurring off-site injuries and deaths. Also, these methods for generating hydrogen from water use many steps. Fewer steps lower the capital and operating costs and result in higher efficiencies.

Therefore, there is a need for a new method for generating hydrogen that can be preformed at a lower temperature and pressure, using nonvolatile and/or less toxic reactants that require a only a minimum number of process steps and readily available equipment.

SUMMARY OF THE INVENTION

These and other objectives have been met by the present invention, which provides, in one aspect, a method for producing hydrogen by reacting a multi-valent metal oxide with water and a carbonate to produce an alkali metal-multi-valent metal oxide compound, carbon dioxide, and hydrogen. The process can further comprise a regeneration step.

The process described herein avoids the use of an energy intensive and inefficient electrolysis step. In addition, no highly toxic gases or compounds are employed or produced as in the sulfur-iodine process. Furthermore, the reaction can be preformed at a lower temperature and pressure than the sulfur-iodine process.

For a better understanding of the present invention, together with other and further advantages, reference is made to the following detailed description, and its scope will be pointed out in the subsequent claims

BRIEF DESCRIPTION OF THE FIGURES

FIG. 3. Illustration of anion resin exchange for removing the alkali metal carbonate from the amino complex.

DETAILED DESCRIPTION OF THE INVENTION

Throughout this specification, parameters are defined by maximum and minimum amounts. Each minimum amount can be combined with each maximum amount to define a range.

The present invention is based on the surprising discovery by the inventors of a carbonate thermochemical cycle for producing hydrogen at a lower temperature. The carbonate thermochemical cycle is essentially a three-step process where hydrogen is produced in the first step, first step reaction product is converted to an amino carbonate, and the initial reactants are regenerated in the final step.

Accordingly, in one aspect, the present invention provides a method for producing hydrogen. The method comprises reacting a multi-valent metal oxide with water and a carbonate to produce an alkali metal-multi-valent metal oxide compound, carbon dioxide, and hydrogen. Throughout this description and claims, the terms "water" and "steam" are used interchangeably, recognizing that under appropriate process conditions, such as temperature and pressure, either may be present and thus both of these terms refer to both liquid and vapor phases.

Valency is a measure of the number of chemical bonds that can be formed by the atoms of a given element. The term "multi-valent" as used herein refers to elements that have a valency of two or more. For example, some elements can have a valency of two, three, four, five, six, or seven.

Figure 1:
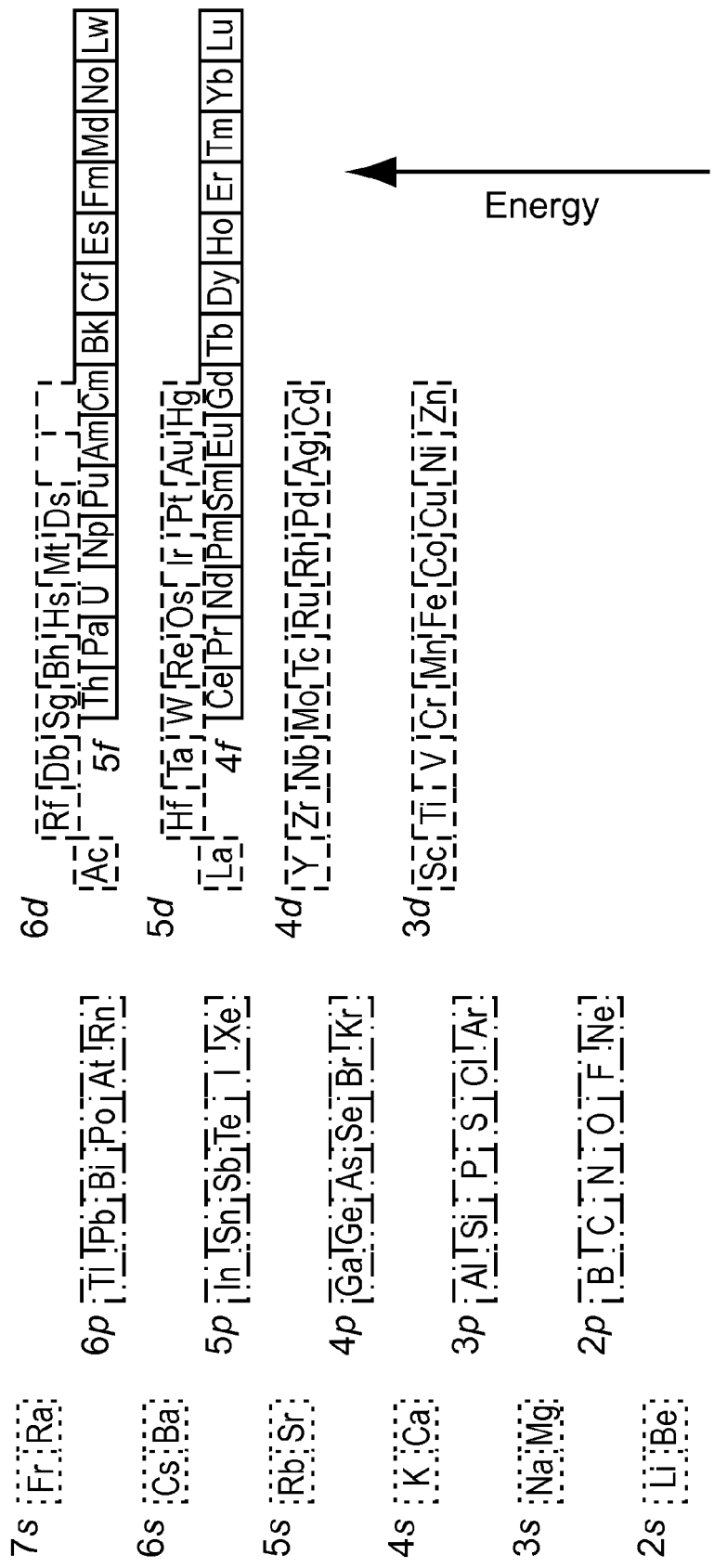
FIG. 1. Shows the narrow energy band gaps and overlaps between 5d-4f and 6d-5f atomic orbitals.
Figure 2:
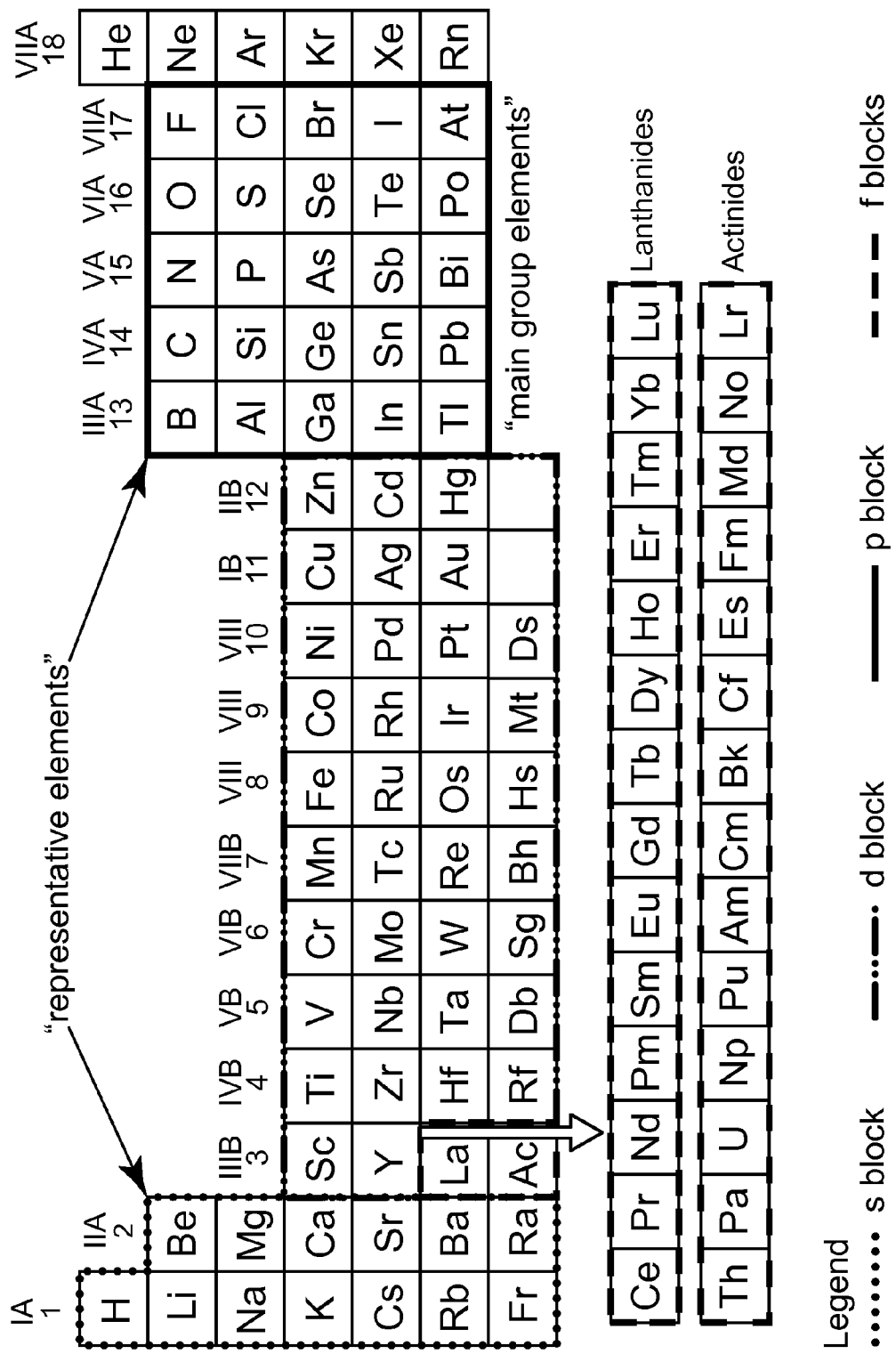
FIG. 2. Periodic table of the elements and the elements in each block.

The metal moiety in the multi-valent metal oxide are those metals that have relatively narrow and variable energy gaps between the 5$d$-4$f$ and 6$d$-5$f$ atomic orbitals (see FIG. 1). This allows access to multiple valence states and allows control of their relative stabilities by altering the counter ions and or complex moieties. Examples of metals that shift the stability of the atomic electron configurations by changing coordination moieties are the Lanthanides, Actinides, and row 5 and 6 transition metals. Other elements that have these characteristics include elements from the f-block and row 6 and 7 of the d-block elements and the row 6 p-block elements (see FIG. 2).

The relatively narrow and variable energy gaps between the 5$d$-4$f$ and 6$d$-5$f$ atomic orbitals of the multi-valent metal, during the reaction of the multi-valent metal, carbonate and water, results in a change in the oxidation state of the multi-valent metal which drives the decomposition of the water to produce hydrogen.

In one preferred embodiment, the multi-valent metal moiety is uranium. Thus, in this embodiment, the multi-valent metal oxide is uranium oxide. In a preferred embodiment, the uranium oxide is $U_3O_8$. In another preferred embodiment, the uranium dioxide is $UO_2$. In yet another preferred embodiment, the uranium trioxide is $UO_3$.

Any carbonates can be used in the method of the present invention. In one preferred embodiment, the carbonates are alkali metal carbonates. The term "alkali metal" as used herein refers to any element in Group I (IUPAC style) of the periodic table (see FIG. 2). Examples of alkali metals include lithium (Li), sodium (Na), potassium (K), rubidium (Rb), cesium (Cs), and francium (Fr).

In one preferred embodiment, the alkali metal carbonate is sodium carbonate. In another preferred embodiment, the alkali metal carbonate is lithium carbonate. In a further embodiment, the alkali metal carbonate is calcium carbonate.

The reaction of the multi-valent metal, carbonate and water is carried out in a temperature range from about 300° C. to about 750° C. Preferably, the minimum temperature is about 350° C., more preferably about 400° C., even more preferably about 450° C., and most preferably about 500° C. The maximum temperature for the reaction is preferably about 700° C., more preferably about 675° C., and even more preferably about 650° C., and most preferably about 625° C. For example, a suitable temperature range for carrying out the reaction is about 600° C. to about 650° C.

In one embodiment, a preferred reaction is shown in equation 5 below.

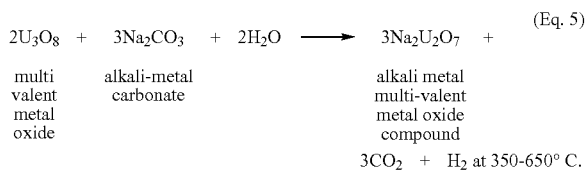

(Eq. 5)

2U$_3$O$_8$ + 3Na$_2$CO$_3$ + 2H$_2$O ⟶ 3Na$_2$U$_2$O$_7$ +

| multi valent metal oxide | alkali-metal carbonate | | alkali metal multi-valent metal oxide compound |

3CO$_2$ + H$_2$ at 350-650° C.

In another embodiment, another preferred reaction is shown in equation 6 below.

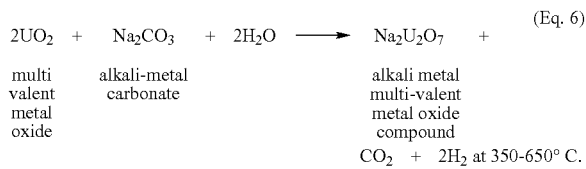

(Eq. 6)

2UO$_2$ + Na$_2$CO$_3$ + 2H$_2$O ⟶ Na$_2$U$_2$O$_7$ + multi valent metal oxide / alkali-metal carbonate / alkali metal multi-valent metal oxide compound CO$_2$ + 2H$_2$ at 350-650° C.

In yet another embodiment, another preferred reaction is shown in equation 7 below.

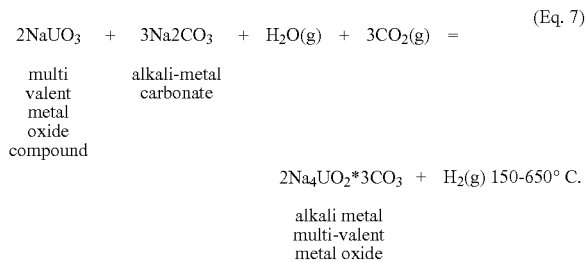

(Eq. 7)

2NaUO$_3$ + 3Na2CO$_3$ + H$_2$O(g) + 3CO$_2$(g) = multi valent metal oxide compound / alkali-metal carbonate

2Na$_4$UO$_2$*3CO$_3$ + H$_2$(g) 150-650° C.

alkali metal multi-valent metal oxide

In still another embodiment, another preferred reaction is shown in equation 8 below.

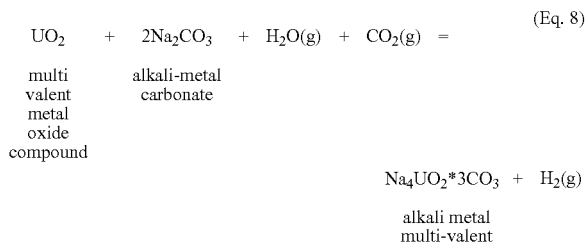

(Eq. 8)

UO$_2$ + 2Na$_2$CO$_3$ + H$_2$O(g) + CO$_2$(g) = multi valent metal oxide compound / alkali-metal carbonate

Na$_4$UO$_2$*3CO$_3$ + H$_2$(g)

alkali metal multi-valent metal oxide

The alkali metal-multi-valent metal oxide compound product that is produced during the production of hydrogen depends on the type of multi-valent metal oxide and alkali-metal carbonate utilized in the reaction. The chemical composition of the alkali metal-multi-valent metal oxide compound produced can be readily determined by those skilled in the art based on the type of reactants utilized.

For example, the reactants utilized in equation 5 for the multi-valent metal oxide and alkali-metal carbonates are $U_3O_8$ and $Na_2CO_3$, respectively. Water is also added to the reaction. Therefore, one of ordinary skill in the art can readily determine that the alkali metal-multi-valent metal oxide compound product produced during the production of hydrogen is $Na_2U_2O_7$.

The carbon dioxide can be removed from the hydrogen by any method know to those skilled in the art. For example, the carbon dioxide can be removed by condensing or by trapping as an alkali metal or an amino carbonate in order to recycle these compounds. Alternatively, carbon dioxide can be separated from the hydrogen by transpiration of the hydrogen through a semipermeable membrane. The carbon dioxide is preferably utilized in the regeneration process described below.

In another embodiment, the method for producing hydrogen further comprises the regeneration of the original reaction components used in the production of hydrogen discussed above. In other words, the alkali metal-multi-valent metal oxide compound product that is produced during hydrogen production is converted to a chemical form that decomposes autocatalytically to the original starting product.

The first step for this embodiment of regenerating the original reaction components is to react the alkali metal-multi-valent metal oxide compound with an amino carbonate and carbon dioxide to form an amino multi-valent complex and an alkali metal carbonate. This step is carried out at any temperature that is greater than 0° C. and less than 100° C. For example, this reaction step can be preformed at room temperature (e.g., approximately between 20° C. to 25° C.) and may be done in an aqueous phase.

Any amino carbonate can be utilized in this step of the present invention. Examples of amino carbonates include, but are not limited to, ammonium carbonates and quaternary ammonium carbonates.

In one embodiment, a preferred regeneration reaction is shown in equation 9 below.

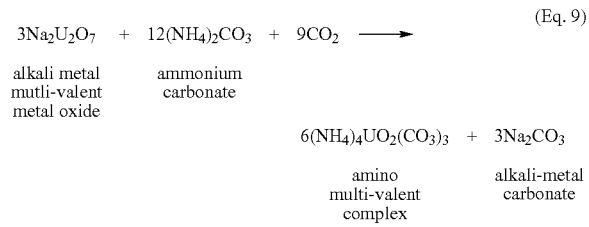

(Eq. 9)

The amino multi-valent complex and the alkali-metal carbonate produced in the first step of the regeneration process depend on the type of alkali metal multi-valent metal oxide and ammonium carbonate utilized in the reaction. The chemical composition of the ammonium complex and the alkali metal carbonate produced can be readily determined by those skilled in the art based on the type of reactants utilized.

For example, the reactants utilized in equation 9 for the alkali metal multi-valent metal oxide and ammonium carbonate are $Na_2U_2O_7$ and $(NH_4)_2CO_3$, respectively. Carbon dioxide is also added to the reaction. Therefore, one of ordinary skill in the art can readily determine that the amino multi-valent complex and alkali-metal carbonate produced in the first step of the regeneration process is $(NH_4)_4UO_2(CO_3)_3$ and $Na_2CO_3$, respectively.

The next step in the regeneration process is to remove the alkali metal carbonate from the mixture with the amino multi-valent complex. The alkali metal carbonate can be removed by any method known to those skilled in the art. Examples of such suitable methods include, but are not limited to, anion resin exchange, gel permeation chromatography, reverse osmosis, etc. FIG. 3 illustrates an example of a reaction scheme to separate the alkali-metal carbonate from the amino multi-valent complex.

Typically, the process for removing the alkali metal carbonate from the amino multi-valent complex is preformed at a temperature that is greater than 0° C. and less than 100° C. For example, the removal process can be preformed at room temperature (e.g., approximately between 20° C. to 25° C.).

The last step in the regeneration process includes thermally decomposing the amino multi-valent complex to form oxygen and the multi-valent metal oxide. The thermal decomposition of amino multi-valent complex is preformed at a temperature range of about 150° C. to about 400° C. Preferably, the minimum temperature is about 175° C., more preferably about 200° C., even more preferably about 225° C., and most preferably about 250° C. The maximum temperature for the reaction is preferably about 400° C., more preferably about 385° C., and even more preferably about 375° C., and most preferably about 350° C.

In one embodiment, a preferred regeneration reaction is shown in equation 10 below.

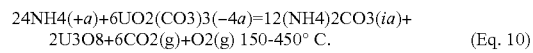

(Eq. 10)

Figure 4:
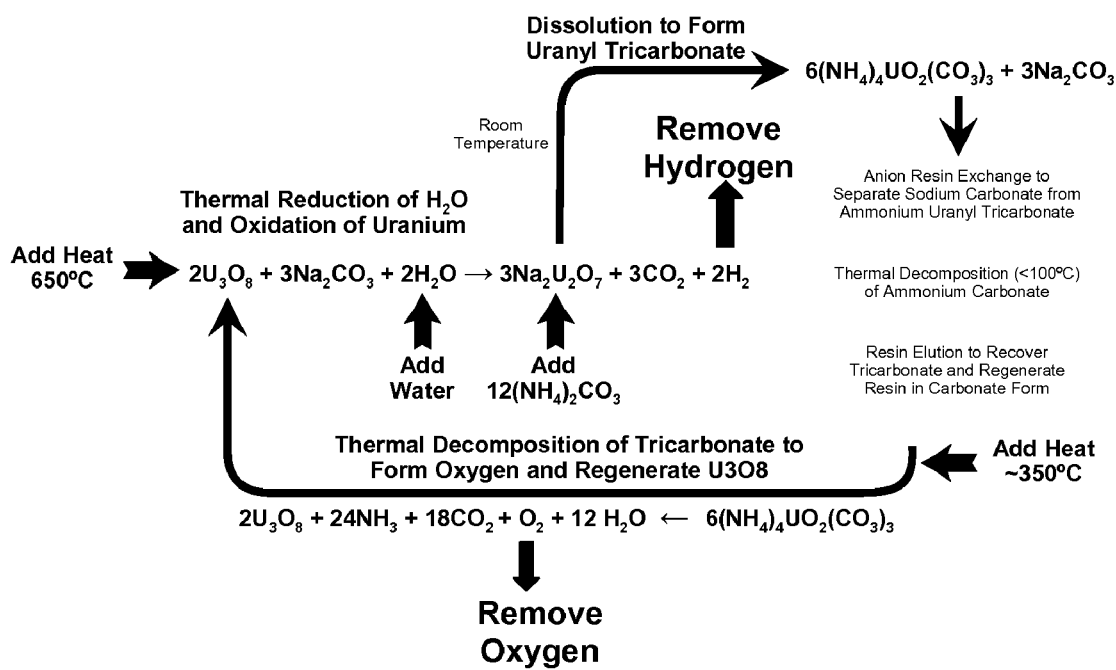
FIG. 4. Illustration of a carbonate thermochemical cycle for the production of hydrogen.

The multi-valent metal oxide produced by thermal decomposition can be recycled and used as a reactant for producing hydrogen. An example of a carbonate thermochemical cycle of the present invention for the production of hydrogen is illustrated in FIG. 4.

The processes described above (e.g., method for producing hydrogen and/or regeneration process) is typically performed at a pressure range of about 1 to about 3 atm of total gases. The gases are recycled, used to aid separation of hydrogen, and to minimize hydrogen explosion hazards. The gas may be, for example, carbon dioxide, nitrogen, argon, helium, xenon or combinations thereof.

The hydrogen can be separated from the gases by any method known to those skilled in the art. Suitable methods include the use of selective membranes (such as platinum group metals, other dense metallic (e.g., TiNi or TiAg alloys), microporous ceramic, micro porous carbon, dense ceramic, and others). Other separation methods include pressure swing adsorption and cryogenic separation.

EXAMPLES

Example 1

Carbonate Thermochemical Cycle Production of Hydrogen

Experiments with $U_3O_8$, $UO_2$ and $Na_2CO_3$ were preformed at 625° C. and 750° C. The solid products from the $U_3O_8$, $UO_2$ and $Na_2CO_3$ reaction were transferred to an alkaline carbonate solution.

In the presence of amino carbonate, all of the solids went into solution, which indicates a complete conversion of the uranium (IV) to uranium (VI).

This uranium solution was passed through an anionic ion exchanger (Dowex 1), and the amino multi-valent complex laded resin was rinsed with deionized water. The presence of uranium on the washed ion exchanger was confirmed. The uranium was stripped from the ion exchanger using saturated ammonium carbonate. The uranium solution was evaporated and then heated to 400° C., where the amino multi-valent complex decomposes to regenerate the starting multi-valent metal oxide.

Thus, while there have been described what are presently believed to be the preferred embodiments of the invention, changes and modifications can be made to the invention and other embodiments will be know to those skilled in the art, which fall within the spirit of the invention, and it is intended to include all such other changes and modifications and embodiments as come within the scope of the claims as set forth herein below

What is claimed is:

1. A method for producing hydrogen, the method comprising reacting uranium oxide, water and an alkali metal carbonate to produce an alkali metal-uranium oxide compound, carbon dioxide, and hydrogen.

2. The method according to claim 1, wherein the uranium oxide is $U_3O_8$.

3. The method according to claim 1, wherein the uranium oxide is $UO_2$.

4. The method according to claim 1, wherein the uranium oxide is $UO_3$.

5. The method according to claim 1, wherein the alkali metal carbonate is sodium carbonate.

6. The method according to claim 1, wherein the alkali metal carbonate is lithium carbonate.

7. The method according to claim 1, further comprising the steps of:
  (i) reacting the alkali metal-uranium oxide compound with an amino compound and carbon dioxide to form an amino uranium complex and an alkali metal carbonate;
  (ii) removing the alkali metal carbonate; and
  (iii) thermally decomposing the amino uranium complex to form oxygen and the uranium metal oxide.

* * * * *